May 13, 1930.  C. W. SIMON  1,758,541
HOLLOW PLUG CONNECTION
Filed July 1, 1929
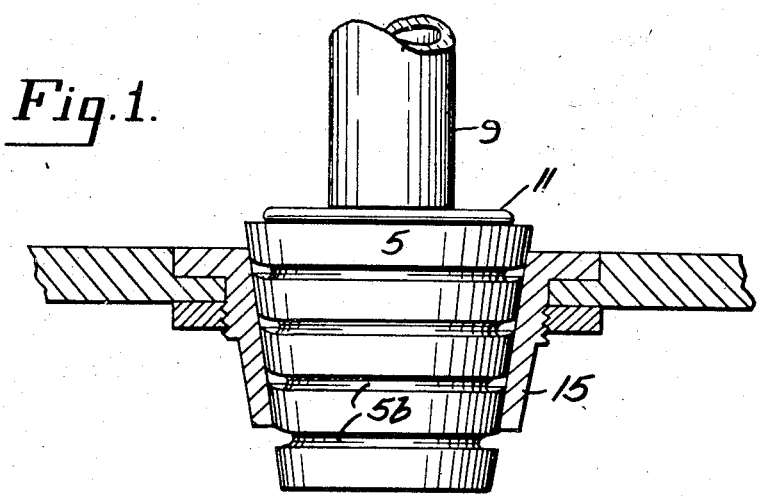
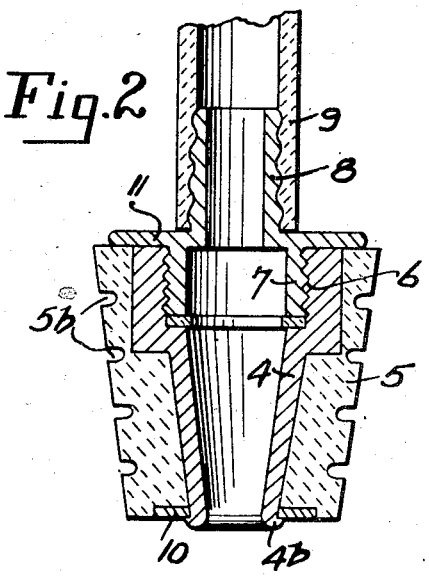
INVENTOR
Charles W. Simon
BY
Gerald F. Baldwin
ATTORNEY Patented May 13, 1930

1,758,541

UNITED STATES PATENT OFFICE

CHARLES W. SIMON, OF DETROIT, MICHIGAN

HOLLOW PLUG CONNECTION

Application filed July 1, 1929. Serial No. 375,107.

This invention relates to hollow plug connections, and refers primarily to a connection that may be mounted on one end of a hose or pipe and fitted securely into a waste pipe, so that water pressure may be exerted therethrough to flush pipes, either to prevent them from becoming clogged or to dislodge obstructing matter therein.

It is an object of the invention to provide a hollow plug connection having a tubular core adapted to be easily mounted on a hose, and a resilient annular member around the core that will grip the bore of a waste pipe so that ordinarily the pressure of water passing through the connection will not dislodge it.

Another object of the invention is to provide such a connection which is simple to manufacture and use.

With these and other objects and advantage in view which will become apparent as the specification proceeds, the invention is hereinafter more fully described with the aid of the accompanying drawings, in which:

Figure 1 illustrates an elevation of the invention in position in a waste pipe, the latter being in section, and Figure 2 is a sectional view of the invention.

Referring to the drawings, the tubular core 4, which extends through an annular resilient member 5, is internally threaded at its upper end to receive the externally threaded end 7 of a nipple 8, the opposite end of which is inserted into one end of a hose 9. The core 4 is inserted into the member 5 after the latter is made, and is preferably tapered longitudinally so that its diameter is least towards the bottom. This is done both to facilitate assembly and also to constrict the outlet and thereby accelerate the flow of water therethrough. The core 4 at its lower end has a washer 10 around it and its lower extremity is outwardly flexed at $4^b$ to hold the said washer in place. A flange 11 is formed around the nipple 8 adjacent the top of the member 5 and is preferably almost as large in diameter as the member. This flange provides a means for holding the connection in place if it should exhibit any tendency to move due to back pressure caused by continued obstruction of a waste pipe.

The resilient member 5, is so tapered as to be of smaller diameter towards the bottom, and around its periphery a plurality of annular grooves $5^b$—preferably parallel with one another—are formed. When the connection is placed in position in a waste pipe 15 its upper portion becomes somewhat compressed by the bore of the pipe. The annular grooves $5^b$ allow the upper margins of the outwardly projecting member portions between the grooves to become upwardly flexed as the connection is pushed into position in a waste pipe. In this manner a tight joint is made and the connection does not usually become dislodged under ordinary water service pressures. But should the connection move at all it may be held in position by the flange 11, which is connected to the core 4.

While in the foregoing the preferred embodiment of the invention has been described and shown, it is understood that alterations and modifications may be made therein provided they fall within the scope of the appended claim.

What I claim as my invention and desire to secure by Letters Patent is:

A plug connection comprising a hollow core having an enlarged upper end and a tapered portion extending therefrom said portion being of gradually decreasing diameter and having a correspondingly decreasing bore, a resilient member around said core, the latter being internally threaded at its upper end, a nipple having a threaded end engaging the threaded portion of the core, a flexible hose on the opposite end of the nipple, a flange around the nipple intermediately of its length which bears on the top of the core and extends outwardly over the upper end of the resilient member to limit the upward flexing of the latter, and a washer held around the lower end of the core extending under the resilient member to limit the downward flexing of the latter.

CHARLES W. SIMON.